United States Patent [19]

Baker

[11] Patent Number: 4,496,223
[45] Date of Patent: Jan. 29, 1985

[54] COMPACT AFOCAL ATTACHMENT FOR USE WITH PHOTOGRAPHIC OBJECTIVES

[75] Inventor: James G. Baker, Bedford, N.H.

[73] Assignee: Polaroid Corporation, Cambridge, Mass.

[21] Appl. No.: 318,105

[22] Filed: Nov. 4, 1981

[51] Int. Cl.³ .................. G02B 9/10; G02B 9/12; G02B 13/18
[52] U.S. Cl. .................. 350/432; 350/453; 350/477; 350/481
[58] Field of Search ........... 350/432, 453, 481, 477

[56] References Cited

U.S. PATENT DOCUMENTS

| | | | |
|---|---|---|---|
| 2,169,130 | 8/1939 | Tronnier et al. | 350/453 |
| 2,279,372 | 4/1942 | Herzberger. | |
| 2,298,090 | 10/1942 | Warmisham. | |
| 2,728,266 | 12/1955 | Tolle | 350/453 |
| 2,731,883 | 1/1956 | Koller et al.. | |
| 2,803,167 | 8/1957 | Koller et al.. | |
| 3,029,700 | 4/1962 | Price. | |
| 3,094,580 | 6/1963 | Rosier. | |
| 3,108,152 | 10/1963 | Hermanni. | |
| 3,388,650 | 6/1968 | Westphalen. | |
| 3,472,578 | 10/1969 | Price | 350/453 |
| 3,649,104 | 3/1972 | Edwards et al.. | |
| 3,893,137 | 7/1975 | Ettischer. | |
| 3,903,537 | 9/1975 | Ettischer. | |
| 4,109,995 | 8/1978 | Betensky | 350/432 |
| 4,171,872 | 10/1979 | Baker. | |
| 4,214,829 | 7/1980 | Ohashi. | |
| 4,303,314 | 12/1981 | Matsui. | |

FOREIGN PATENT DOCUMENTS

| | | |
|---|---|---|
| 694071 | 7/1940 | Fed. Rep. of Germany. |
| 370256 | 8/1963 | Switzerland. |
| 1001108 | 8/1965 | United Kingdom. |

Primary Examiner—John K. Corbin
Assistant Examiner—Rebecca D. Gass
Attorney, Agent, or Firm—Francis J. Caufield

[57] ABSTRACT

A compact convertible photographic objective that is separable into two working components consisting of a front substantially afocal component that can be rotated or translated laterally into or away from a coaxial position with a rear component which normally is fixed in position on an assigned optical axis. Movement of the front component into coaxial alignment with the rear component increases the focal length of the combination so that the two components can be used for telephoto purposes.

16 Claims, 6 Drawing Figures

COMPACT AFOCAL ATTACHMENT FOR USE WITH PHOTOGRAPHIC OBJECTIVES

BACKGROUND OF THE INVENTION

1. Field of the Invention

This invention, in general, relates to optical systems and, in particular, to a convertible type of photographic objective that is separable into two working parts consisting of a front part that can be rotated or translated laterally into or away from a coaxial position with a rear part which normally is fixed in position on an assigned optical axis.

2. Description of the Prior Art

For hand photography, considerations of cost and convenience are paramount as are simplicity and reliability of operation. It is also desirable that a camera intended for use both indoors and outdoors by a relatively untrained individual be light weight and adapted for carrying or for safe storage when not in use, as on a shelf or in a drawer. These several requirements are commonly met in the modern era by the use of molded plastic mounts, lenses and body parts of the camera, inasmuch as the specific gravity of plastic is low in comparison with ordinary glass and metallic components. In particular, for cameras of the class required for instant photography, the arrangement of the camera loading and print ejection must be considered, along with the shape and weight limitations indicated above.

It is also desirable with respect to a camera to be used by the general public for instant photography that the single focal length supplied in inexpensive non-zooming hand cameras be augmented or replaced by the use of at least two significantly different focal lengths for the convenience and enjoyment of the photographer. Thus, for closeups and for group pictures requiring a fairly large total angle of view, as for example, a picture diagonal of 50 degrees more or less, one needs to have an equivalent focal length of the order of 115 mm for picture formats of usable size as practiced in the instant photographic field, commonly 3 inches square more or less. Conversely, for portraits and for more distant subject matter one normally wishes to employ an equivalent focal length of greater magnitude, say, in the range from 135 mm to 150 mm, more or less.

To fulfill these requirements one could, of course, provide a camera having two complete objectives of focal lengths 115 mm and 150 mm, for example, each with iris and shutter and suitable electronic and hand operated controls. Considerations of space and cost call instead for some form of less costly convertible objective having either focal length, according to a hand operated or electrically operated control, but occupying essentially the same space within the camera insofar as a single optical axis, single iris and single shutter are concerned.

In the earlier days of photography, so-called convertible objectives were in common use. Then, one screwed on a front part of the objective to obtain a shorter focal length, or used either the front part or the rear part separately to obtain a longer focal length. The fully assembled convertible objective with its shorter equivalent focal length generally was a symmetrical or nearly symmetrical objective with the front and rear parts opposed and curved generally around a central iris or aperture stop and "between-the-lens" shutter. Objectives of those earlier years were almost always composed of various kinds of optical glasses and contained from one to as many as five cemented elements in either of the front and rear components. Some convertible objectives departed quite widely from symmetry, and combination of "new" and "old" glass types were used in the front and rear halves to obtain special corrections.

Convertible objectives of the early form are not well suited to the requirements of a hand camera used for instant photography. Glass lens elements and all-glass objectives are quite heavy and in any event too costly, inasmuch as each element with its two surfaces must generally be ground and polished to prescription, either individually or in blocks. The high curvatures of the strongest elements often require one-at-a-time fabrication of at least one of the two surfaces. Moreover, it is inconvenient to unscrew a front component or to remove it from a bayonet-type mount and to carry it separately from the camera. Such handling of plastic components leads to a progressive deterioration of the lens elements as well. In any event, interchangeable parts of cameras carried separately are not well suited to amateur use in family activities.

Consequently, the ability to extend the focal length of a camera objective lens with a magnifying attachment without changing the effective aperture ratio of the objective is particularly desirable. One attachment commonly proposed for this purpose is a form of Galilean telescope. The Galilean telescope basically comprises a convergent, or positive, component followed by a divergent, or negative, component which, together, form an afocal system, i.e., the object and image planes are at infinity, as are the conjugate focal points. Such a lens condenses a parallel bundle of rays into a smaller parallel bundle effecting a magnification, when the system is focused through a following objective, that depends upon the ratio of the diameters of the entrant and emergent beams. Such systems have long been known as image magnifying attachments for increasing the effective focal length of a lens.

Typically, a Galilean system suffers from field curvature and distortion, and has a narrow field angle, resulting in appreciable vignetting when used with a camera lens having a normal field of view; for example, 40 to 50 degrees. The problem of designing and correcting such a lens is compounded by the location of the camera lens entrance pupil, which becomes the exit pupil for the afocal attachment, well back in the camera. The result is a highly asymmetrical system when the attachment is in place, whereas it would be most desirable to have the limiting stop symmetrically located.

Efforts to improve afocal systems have in general had as objectives either to simplify the problem of correcting for aberrations or to achieve a more compact construction than the simple Galilean telephoto system provides.

As an example of the first approach, U.S. Pat. No. 3,094,580, issued on June 18, 1963 to R. Rosier, describes an afocal system of the concentric type. In the practical embodiment described by Rosier, there are six elements in two air-spaced components. In such a system, the converging and diverging surfaces of the principal parts of the lens are concentric, which considerably simplifies the correction of a number of the significant aberrations. This approach is quite appropriate for use in making a telephoto attachment for small cameras, such as 8 mm or 16 mm movie cameras, for example. However, because the physical size of a lens constructed on the concentric principle tends to be large compared to the focal length of the objective with which it is to be used and because relatively large amounts of expensive glasses are necessarily incorporated in the design, such a lens is not particularly well suited to use with the larger formats.

With six elements, and by the use of a relatively large air space between the front positive and rear negative group of components, I have found it possible to construct a compact afocal system that can be well corrected for any particular objective. Such six element lenses are described in U.S. Pat. No. 3,604,786, issued to me on Aug. 14, 1971, for "Compact Afocal Magnifying Lens".

More recently in U.S. Pat. No. 4,171,872 I have described compact four element afocal attachments which utilize a strongly curved first surface followed by other strongly curved surfaces, using alternating high and low indices of refraction for the successive negative and positive elements, and by correcting the lens less well for longitudinal color and distortion than for other aberrations.

Five element afocal systems that are reasonably well corrected, with the exception of marginal performance with respect to distortion and field curvature, have been designed for relatively smaller magnifications. For example, the Yashinon 1.4×afocal attachment, as made commercially by the Sun Optical Company of Osaka, Japan is such a lens system.

The principal objects of my invention are to simplify the construction, and to decrease the size and weight of afocal attachments for use with objective lenses having buried stops, while retaining acceptable levels of performance, particularly in the field of medium format photography; i.e., for use with film formats having diagonals from 3 to 6 inches more or less.

Another object of my invention is to provide a compact, afocal attachment that is reasonably well corrected for use in medium format photography at modest relative apertures, say no faster than f/10.

Other objects of the invention will in part be obvious and will in part appear hereinafter. The invention accordingly comprises the apparatus possessing the construction, combination of elements, and arrangement of parts which are exemplified in the following detailed description.

SUMMARY OF THE INVENTION

The present invention relates to a compact, convertible optical system that is suitable for use as a photographic objective in a camera for medium format photography at modest f-numbers, no faster than f/10.

The optical system comprises two separable working components, a rear component which is normally fixed in position along an assigned optical axis in the camera and a front, substantially afocal component that can be rotated or translated laterally into or away from coaxial alignment with the rear component. When in coaxial alignment with the rear component, the combination has an increased equivalent focal length to provide a magnification of the image size obtainable with the rear component used by itself.

The afocal front component is Galilean in form and consists of no more than three lens elements, two of which may have aspheric surfaces and the first of which is always a positive meniscus, to achieve magnifications in the range from 1.15 to 1.50 with acceptable performance provided use is limited to rear components having f-numbers no faster than f/10 and angular fields, based on the format diagonal, of no more than 57-degrees more or less.

In preferred two-element all plastic versions of the afocal attachment, acceptable performance at magnifications in the range from 1.15 to 1.50 are achieved when the overall axial length from the first surface of the front component to the first surface of the rear component is not in excess of 0.5 times the focal length of the rear component. If the angular field of the rear component is restricted to 52-degrees more or less, acceptable performance with magnifications in the range from 1.15 to 1.50 can be achieved with extremely compact, all plastic, front components having overall axial lengths not in excess of 0.25 times the rear component focal length.

DESCRIPTION OF THE DRAWINGS

The novel features that are considered characteristic of the invention are set forth with particularity in the appended claims. The invention itself, however, both as to its organization and method of operation together with other objects and advantages thereof will be best understood from the following description of the illustrated embodiment when read in connection with the accompanying drawings wherein like numbers have been employed in the different figures to denote the same parts and wherein:

DESCRIPTION OF THE PREFERRED EMBODIMENT

The present invention relates to a convertible optical system that is particularly suitable for use as a photographic objective in a camera of the type adapted for medium format photography at modest f-numbers. In its preferred embodiment, the present invention is shown incorporated in a highly automated type camera which utilizes self-processable type film and which is designated generally at 10 in FIG. 1.

Figure 1:
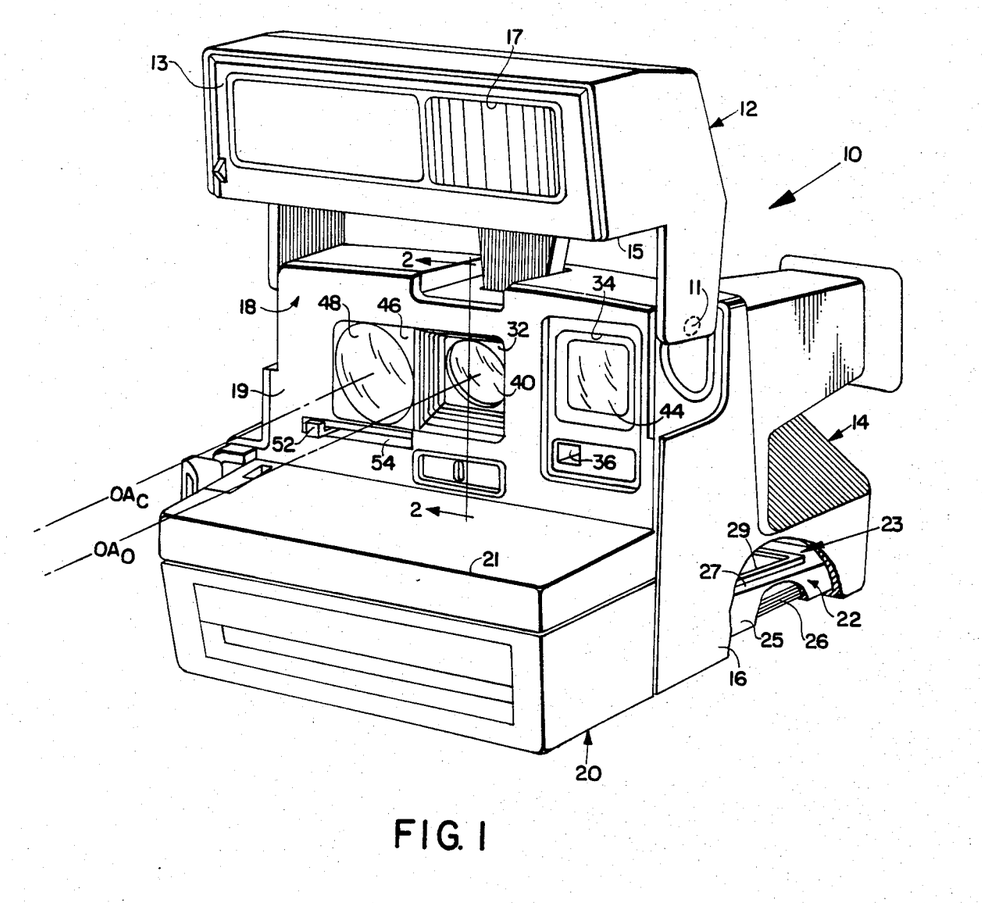
FIG. 1 is a left front perspective view of a camera embodying the present invention.

As best seen in FIG. 1, the camera 10 includes an electronic flash unit 12, preferably of the quench type, mounted on a rigid body 14 for movement between an erect operative position, as illustrated in FIG. 1, and a folded inoperative position which is not illustrated. The rigid camera body 14 includes a generally prismatic shaped major housing 16, a generally L-shaped front housing 18, and a generally rectangularly-shaped film loading door 20 which collectively define its outward appearance and serve to house and protect its interior components. The aforementioned housings, 16 and 18, and the film loading door 20 are all preferably molded of an opaque plastic to preclude unwanted light from entering the camera interior.

The camera L-shaped housing 18 is defined, at least in part, by a plurality of camera housing walls including a forwardly facing wall 19 and an apron wall 21 extending forwardly from a bottom portion of the wall 19 in cooperation therewith to define a camera housing recess. The flash unit 12 has a housing that is defined, at least in part, by a plurality of exterior wall surfaces, one of which (13) is provided with a window 17 behind which a source of illumination, such as an electronic flash tube, has its light output directed toward a scene when the flash unit 12 is pictured as shown. Well-known means including a pair of pivots 11 (only one shown) are provided for coupling the flash unit 12 to the camera housing 14 for relative movement between the operative erect position shown in FIG. 1 and its folded storage position (not shown) wherein a major portion of the flash unit 12 fits into the camera housing recess previously defined. The flash and camera housings are configured such that the flash unit housing bottom wall surface (15) is substantially flush with the camera forwardly facing wall 19 when the flash unit 12 is folded. For a more detailed description of the flash unit folding arrangement, reference may be had to U.S. Pat. No. 4,268,146 issued to Bruce K. Johnson on May 19, 1981 and entitled "Camera With Folding Flash Unit".

Formed in the base of the prismatic housing 16 is a well-known film cassette receiving chamber generally designated at 23. The chamber 23 is adapted to releasably hold a film cassette such as that designated at 22. The cassette 22 comprises a generally rectangular parallelepiped housing 25 which has an upwardly facing wall 27 having a generally rectangular aperture 29 therein. Mounted in registration with and biased toward the aperture 29 is a stacked array of integral type self-processable film units generally designated at 26. Typically such film units have a format diagonal in the range from 3 to 6 inches (76.2 mm to 152.4 mm) more or less. Each of the film units 26 has a given film speed requiring a predetermined exposure which is provided by the camera 10 in a manner to be described. Underneath the stacked array of film units 26 is a flat, thin battery (now shown) which is electrically coupled in a well-known manner to power the various electrical systems of the camera 10. An example of such a film cassette is described in considerable detail in U.S. Pat. No. 3,872,487 issued to Nicholas Gold on March 18, 1975 and entitled "Photographic Film Assemblage and Apparatus" and of such film units in U.S. Pat. Nos. 3,415,644; 3,594,165 and 3,761,268.

Formed in the vertical forwardly facing wall 19 of the L-shaped housing 18 are a number of apertures, designated at 32, 34, and 36. Fixedly mounted in registration with the aperture 32 along an optical axis, $OA_o$, is a fixed focus type objective lens 40 to be described in more detail hereinafter. The objective taking lens 40 is optically registered ahead of an aperture 41 (see FIG. 2) formed in an opaque exposure chamber 42 (partially shown) that is positioned in a well-known manner inside the prismatic shaped housing 16 having a prismatic shaped generally complementary to the interior shape of the housing 16. The objective taking lens 40 is optically structured in a well-known manner to have a depth of field from 4 ft. (1.2 m) to infinity.

Located within the exposure chamber is a trapezoidal-shaped mirror 43 that is arranged at a predetermined angle with respect to the optical axis, $OA_o$, and the film plane to provide a folded light path of predetermined length therebetween along which image forming scene rays emerging from the objective taking lens 40 travel to the film within the cassette 22 during a camera exposure cycle. The exposure chamber is of the type which is described in considerable detail in U.S. Pat. No. 4,057,815 issued to Bruce K. Johnson on Nov. 8, 1977 and entitled "Anti-Flare Structure for Photographic Optical System". It will be recognized by those skilled in the art that, with this type optical arrangement, the objective taking lens 40 and the peripheral edges of the film cassette aperture 29 cooperate to define the field of view of the camera 10, the field of view defining the subject matter that is recorded during photoexposure.

Mounted in registration with the aperture 34 is a negative lens 44 which forms part of a reversed Galilean viewfinder that is structured in a well-known manner to have a field of view that is substantially coextensive with that of the camera 10 to facilitate aiming the camera 10 in order to frame the subject matter to be recorded in a picture.

The aperture 36, which is located just beneath the viewfinder entrance aperture 34, is provided for the purpose of admitting light to a photoelectric device (not shown) which forms a part of the automatic exposure control system of the camera 10.

Aside of the aperture 32 there is a slidable lens carrier 46 in which are mounted along an optical axis, $OA_c$, a pair of lens elements, 48 and 50, which collectively define a compact, substantially afocal lens component for providing an increase in focal length over that of the objective lens 40 so that the camera 10 can be used for telephoto purposes. The lens carrier 46 is slidably mounted in a well-known manner so that the lenses 48 and 50 can be coaxially aligned with the optical axis, $OA_o$, for this purpose. This is accomplished simply by manually pushing or pulling on a lever 52 which extends through a slot 54 below the lens carrier 46. A detailed description of the lens elements, 48 and 50, follows.

Exposure of the film units 26 is regulated in a well-known manner through the use of an automatic exposure control system (not shown) of the type that is more fully described in U.S. Pat. No. 4,255,030 issued on Mar. 10, 1981 in the name of Bruce K. Johnson et al. and entitled "Camera With Proportional Fill Flash Quench Strobe". The exposure control system described in the above-referenced U.S. patent application utilizes the output signal of the camera photoelectric device to control the firing of the electronic flash 12 so as to automatically provide a proportional fill flash under conditions where the natural or ambient scene lighting is of high intensity and may also control the firing of the electronic flash 12 under conditions of negligible ambient scene light intensity wherein the proportion of the exposure attributable to the artificial scene light provided by the electronic flash 12 automatically increases in correspondence with decreases in the ambient scene light intensity.

For this purpose, the camera exposure control system also includes a pair of reciprocating apertured shutter blades 56 and 58 (see FIG. 2) located more or less in a plane ahead of the exposure chamber aperture 41 to selectively unblock the aperture 41 to expose the film units 26 to scene light. In this manner, the apertures defined by the blades 56 and 58 represent a buried stop which is substantially separated from the objective lens 40.

The optical system of the invention in a manner to be described provides the user of the camera 10 with a compact convertible objective system having two significantly different focal lengths suitable for use in taking either normal pictures (shorter focal length) or portraits or pictures of distant subject matter (larger focal length).

Convertibility of the optical system is achieved with a front component of afocal nature (lens elements, 48 and 50) and a fixed rear component (lens element 40). The front component, consisting of the lens elements 48 and 50 mounted in the slider 46, provides an increase in focal length over that of the rear component, lens element 40, when the former elements are coaxially aligned with the optical axis, $OA_o$, in the manner previously described.

Figure 2:
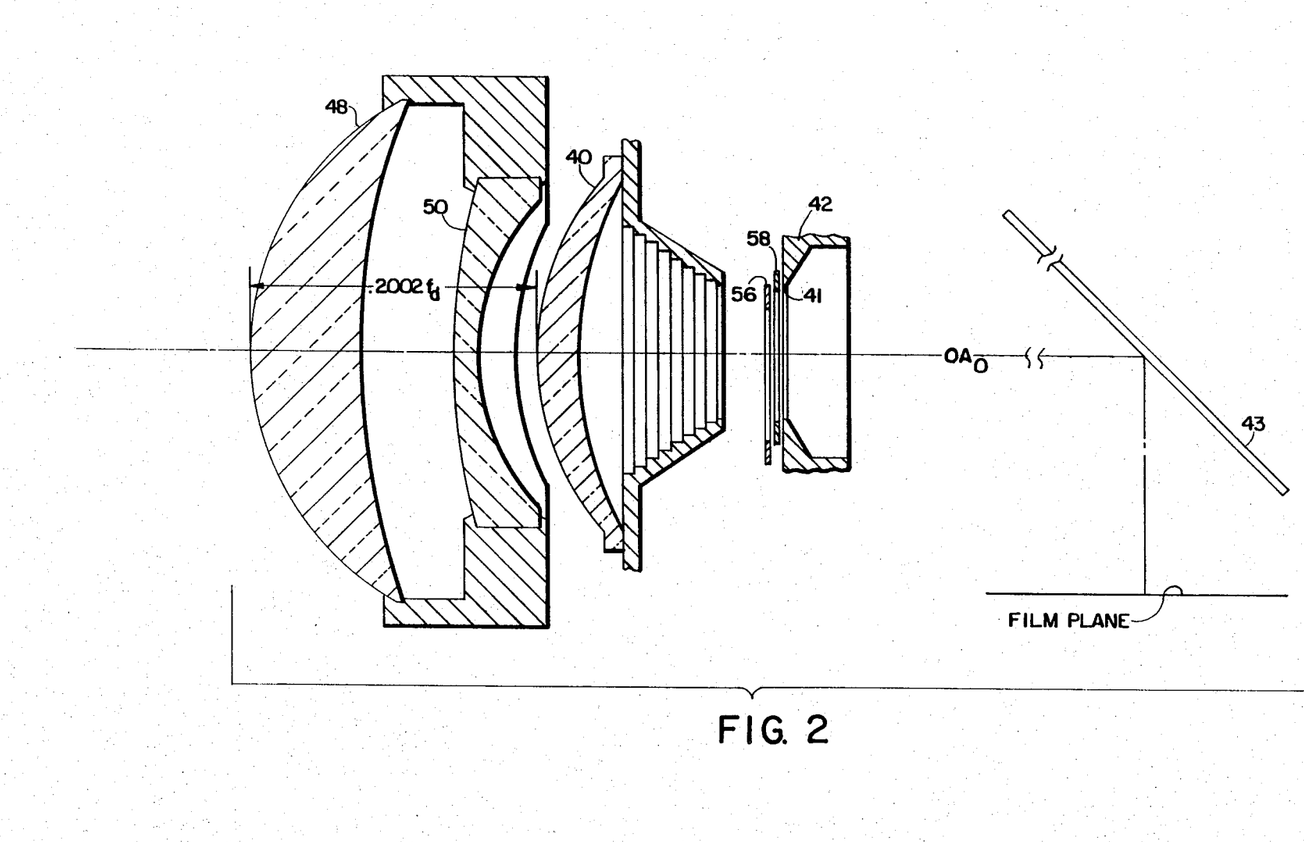
FIG. 2 is an enlarged sectional view of the invention taken generally along line 2—2 in FIG. 1.

Referring now to FIG. 2, it can be seen that the rear component (40) is a single aspheric preferably plastic element being of a positive meniscus dioptric nature, and curved generally around the rear aperture stop (41) and shutter blade location (56 and 58). By having the shutter blades 56 and 58 in the rear of the objective, an inexpensive means is obtained for shutter controls protected from external damage and atmospheric effects by the presence of a sealing function provided by a single lens element in front. This single aspheric lens element 40 is designed to perform the function of a single element landscape lens as used in various cameras old and new, but the aspheric surface has been so devised as to reduce distortion and astigmatism to manageable levels as shown in U.S. application No. 246,224 filed in the name of R. Calvin Owen et al and assigned to Polaroid Corporation.

The magnifying front component preferably is made of plastic, and if plastic of the several kinds of optical plastics in common use for optical purposes, such as plexiglass, polycarbonate, polystyrene or methyl methacrylate. It has proved to be sufficient and certainly inexpensive to make use of a simple pair of air-spaced aspheric elements, for the front component. The first of the pair, 48, lying on the long conjugate side of the first component and thereby first struck by the oncoming light rays from the object scene, should generally be of a plastic of relatively high Abbe-number, such as ordinary plexiglass or methacrylate. Use of the high Abbe-number keeps the errors caused by light dispersion to a minimum, and in particular, minimizes the 'lateral color' or lateral chromatism which is characteristic of oblique prismatic refractions through the edges of lens elements far from the effective pupil in its own image space.

For the second element 50 of the front component it has been found advantageous to use a plastic of low Abbe-number, that is, of great dispersive power, such as either polystyrene or polycarbonate. One might resort to other optical materials that would be of mathematical advantage, such as some one of the alkaline halides which are characterized by moderately low indices but with very great dispersive power, but such materials are not suitable for hand photography under the full range of conditions. Accordingly, the use of polycarbonate has been adapted as being a fully transparent plastic material with good optical properties and capable of being molded inexpensively. The use of polystyrene is just as satisfactory from the point of view of either design or mathematics, and hence either material can be considered as lying within the spirit of the invention.

By way of an example, constructional data for the fixed rear component 40 is given as follows. The rear component has an equivalent focal length in yellow light of 103.05 mm. For an object distance of 17.32 focal lengths, the back focal distance in yellow light is 103.68 mm. The convex first radius (long conjugate side) of this rear component is 18.796 mm and the radius of the concave second surface (on the short conjugate side) is 28.227 mm. The adopted central thickness is 3.155 mm. In addition, the concave rear surface departs from spherical shape in such a way as to strike a compromise between the requirements of acceptable residuals for distortion correction and acceptable image quality at an adopted lens speed of about f/12.0. The useful field over which acceptable performance is obtained at f/12.0 is 57.38-degrees.

The exact nature of the aspheric superimposed surface correction is a matter depending on the desired balance of aberration and distortion, the former depending in turn on the average nature of the photographic emulsion to be used with the camera, and weighting factors over the field of view. The shape given below is such that the uniformly weighted circle of confusion for green light over the field is approximately 0.125 mm at f/12. The aspheric surface is defined in the usual terms by the expression:

$$Z = \frac{CS^2}{1 + \sqrt{1 - C^2S^2}} + \beta S^4 + \gamma S^6 + \delta S^8 + \epsilon S^{10} + \zeta S^{12}$$

where C is the reciprocal of the surface apex radius in reciprocal millimeters, Z represents the distance of a point on the aspheric surface measured in millimeters from the surface vertex and parallel to the Z-axis, and S in millimeters is the radial distance of the point measured perpendicular to the Z-axis and wherein the coefficients, $\beta$ through $\zeta$, are given as follows:

beta = $0.472 \times 10^{-5}$
gamma = $0.130 \times 10^{-7}$
delta = $-0.729 \times 10^{-9}$
epsilon = $0.639 \times 10^{-11}$
zeta = $-0.213 \times 10^{-13}$ It should be observed that the choice of aspheric shape is not in this instance a part of my invention but simply an example of a usable rear component with the properties amenable to change by the addition of a suitable front component.

The constructional data for the rear component in terms of unit focal length $f_d = 1.000$ is given in Table I below.

TABLE I

| | (Refer to FIG. 2, Element 40) | | | | |
|---|---|---|---|---|---|
| | | Separation | | | |
| Surface | Radius | Medium | Air | $N_d$ | $V_d$ |
| 1 | 0.1824 | 0.0306 | | 1.4917 | 57.2 |
| 2 | 0.2739* | | | | |

*aspheric surface

The aspheric surface remains the same for the unit focal length data as follows:

beta = $0.517 \times 10^1$
gamma = $0.151 \times 10^3$
delta = $-0.900 \times 10^5$
epsilon = $0.84 \times 10^7$
zeta = $-0.30 \times 10^9$ In Table I, the surfaces of the element are in numerical order from object to image space, $N_d$ is the index of refraction and $V_d$ is the Abbe dispersion number.

In Table II below is given the constructional data for a typical combination of a first component as characteristic of the invention, and a repetition of the data of Table I above, this time in combination as the second component.

TABLE II
(Refer to FIG. 2)

| Surface | Radius (mm) | Separation Medium | Separation Air | $N_d$ | $V_d$ |
|---|---|---|---|---|---|
| 1 | 19.59 | 8.76 | | 1.4917 | 57.2 |
| 2 | 88.41* | | 6.72 | | |
| 3 | 61.39* | 1.03 | | 1.592 | 30.8 |
| 4 | 15.45 | | 4.12 | | |
| 5 | 18.80 | 3.16 | | 1.4917 | 57.2 |
| 6 | 28.23* | | | | |

*aspheric surfaces

In Table II, the surfaces are the surfaces of the elements in numerical order from object space to image space as shown in FIG. 2, $N_d$ is the index of refraction and $V_d$ is the Abbe dispersion number.

As denoted by the asterisk, surfaces 2 and 3 of the first component are aspheric and surface 6, which is the second surface of the second component, is also aspheric, as described above. The aspheric shapes of surfaces 2 and 3 are described in accordance with the general formula previously given, whose coefficients in the particular surfaces are as follows:

Surface 2:
- $beta = 0.719 \times 10^{-5}$
- $gamma = -0.608 \times 10^{-8}$
- $delta = 0.781 \times 10^{-14}$
- $epsilon = 0.502 \times 10^{-20}$
- $zeta = 0.000 \times 10^{0}$ Surface 3:
- $beta = -0.355 \times 10^{-5}$
- $gamma = -0.506 \times 10^{-8}$
- $delta = -0.111 \times 10^{-12}$
- $epsilon = -0.885 \times 10^{-19}$
- $zeta = 0.000 \times 10^{0}$ Surface 6:
- $beta = 0.472 \times 10^{-5}$
- $gamma = 0.130 \times 10^{-7}$
- $delta = 0.729 \times 10^{-9}$
- $epsilon = 0.639 \times 10^{-11}$
- $zeta = 0.213 \times 10^{-13}$ Recast in terms of a unit focal length, $f_d = 1.000$, for the rear component (element 40), the constructional data of Table II appears as in Table III below.

TABLE III
(Refer to FIG. 2)

| Surface | Radius | Separation Medium | Separation Air | $N_d$ | $V_d$ |
|---|---|---|---|---|---|
| 1 | 0.1901 | 0.0850 | | 1.4917 | 57.2 |
| 2 | 0.8579* | | 0.0652** | | |
| 3 | 0.5958* | 0.0100 | | 1.592 | 30.8 |
| 4 | 0.1499 | | 0.0400 | | |
| 5 | 0.1824 | 0.0306 | | 1.4917 | 57.2 |
| 6 | 0.2739* | | | | |

*aspheric surfaces
**this air space can be varied for focusing if desired

In Table III, the description of the aspheric surfaces in unit focal length terms is given below, and as noted by the double asterik, the air space between surfaces 2 and 3 can be varied to effect focus changes.

Surface 2:
- $beta = 0.787 \times 10^{1}$
- $gamma = -0.707 \times 10^{2}$
- $delta = 0.964 \times 10^{0}$
- $epsilon = 0.658 \times 10^{-2}$
- $zeta = 0.000 \times 10^{0}$ Surface 3:
- $beta = -0.388 \times 10^{1}$
- $gamma = -0.588 \times 10^{2}$
- $delta = -0.137 \times 10^{2}$
- $epsilon = -0.116 \times 10^{0}$
- $zeta = 0.000 \times 10^{0}$ Surface 6:
- $beta = 0.517 \times 10^{1}$
- $gamma = 0.151 \times 10^{3}$
- $delta = -0.900 \times 10^{5}$
- $epsilon = 0.838 \times 10^{7}$
- $zeta = -0.296 \times 10^{9}$ The optical system of Tables II and III is intended to operate satisfactorily for normal usage in instant photography at an aperture ratio of about 12, or as customarily written, f/12 as defined at an object distance of 17.32 unit focal lengths. For infinity focus, the corresponding aperture ratio is 10, or f/10 in customary terms. As will be noticed with reference to Tables II and III, the overall axial length of the front component measured from the front surface of its first component, the positive meniscus 48, to the first surface of the objective 40 is 0.2002 times the focal length of the objective 40 whether in terms of absolute or unit focal length. This indicates that the barrel length of the afocal front component is quite short compared to the focal length of the objective 40 and thus permits the afocal front component to be quite compact as illustrated in FIGS. 1 and 2.

If a slower lens speed should be satisfactory for some applications, particularly with the faster emulsions now becoming available, then either the aspherics of the first component can be reduced in aspheric depth, reduced to but one aspheric on some one of the surfaces, or eliminated altogether. In any event, according to the overall lens speed and quality of imagery, the distribution, nature of, and depth of the aspheric or spherics of the first component remain optional within the spirit of the invention, and are to be used in a way consistent with controlled costs and quality of results.

The aspheric surface of the second component, while not a part of this invention, has not only image quality to attain but also a satisfactory reduction of distortion for applications in instant photography. Therefore, while a simple spherical element has been used in landscape photography from many decades ago, the added aspheric shape becomes of importance in present day applications and ought to be retained.

The construction data for a second example of the invention shown in FIG. 3, utilizing a glass (LaK-7 for example) meniscus element for the first element of the front afocal component and a plastic (polystyrene) for its second element is presented in Table IV below in terms of the unit focal length of the objective of Example I. The magnification achieved with this design is 1.4674 at a relative aperture of 12 and an objective field angle, as in previous examples, of 57.38 degrees. Here the axial length to objective focal length ratio is 0.2571. The data presented in Table IV and the aspheric information following it are in terms previously described.

Figure 3:
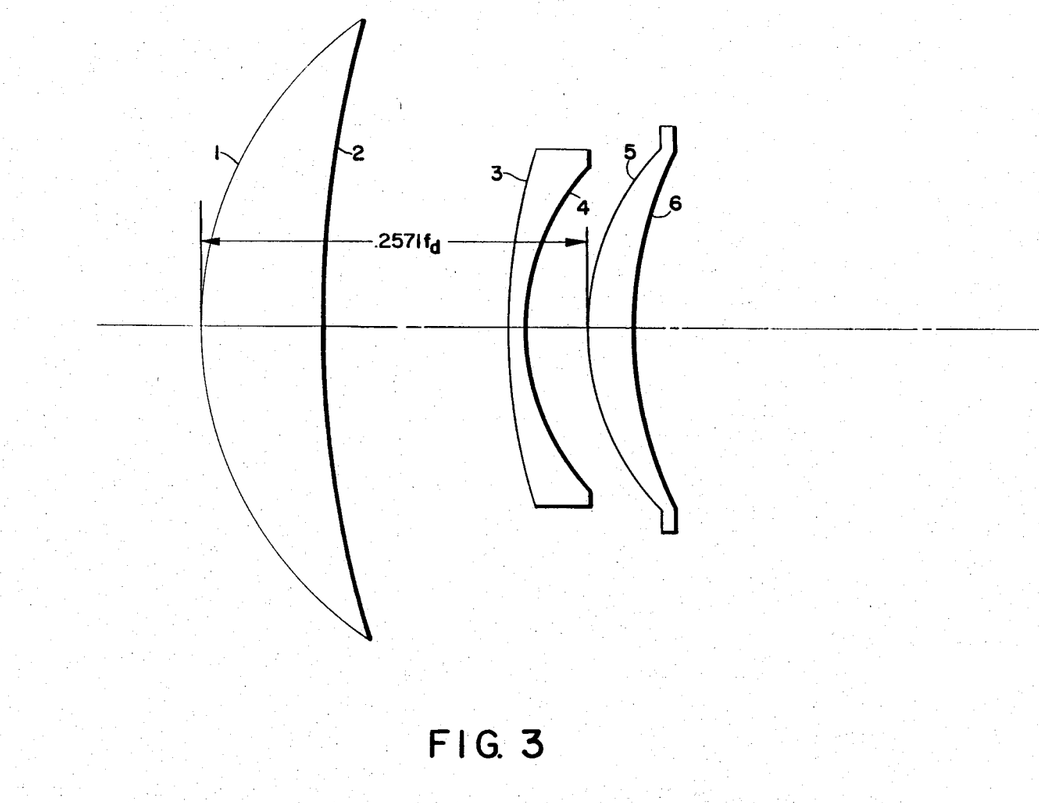
FIG. 3 is an enlarged elevational view of an alternative embodiment of the invention.

TABLE IV
(Refer to FIG. 3)

| Surface | Radius | Separation Medium | Separation Air | $N_d$ | $V_d$ |
|---|---|---|---|---|---|
| 1 | 0.2543 | 0.0850 | | 1.652 | 53.5 |
| 2 | 0.9005 | | 0.1221** | | |
| 3 | 1.0230* | 0.0100 | | 1.592 | 30.8 |
| 4 | 0.1635 | | 0.0400 | | |
| 5 | 0.1824 | 0.0306 | | 1.4917 | 57.2 |
| 6 | 0.2739* | | | | |

*aspheric surfaces
**This air space can be varied for focusing. For this example, the object distance is 17.21 unit focal lengths (where $f_d = 1.0000$ for the singlet of Example I)

The aspheric shapes of surfaces 3 and 6 of Table IV are described in accordance with the general formula previously given, whose coefficients in the particular surfaces in unit focal length terms are as follows:

Surface 3:
 beta = $-0.592 \times 10^1$
 gamma = $-0.594 \times 10^2$
 delta = $-0.137 \times 10^2$
 epsilon = $-0.116 \times 10^0$
 zeta = $0.000 \times 10^0$ Surface 6:
 beta = $0.517 \times 10^1$
 gamma = $0.151 \times 10^3$
 delta = $-0.900 \times 10^5$
 epsilon = $0.838 \times 10^7$
 zeta = $-0.296 \times 10^9$ A third example of the invention, this time for an all plastic version with a magnification of 1.4703 at f/12 and a field angle of 57.38 degrees, is represented by the constructional data of Table V (refer to FIG. 4) and the aspheric information following Table V. Again the data is normalized with respect to the focal length of the objective of Example I. This example also has an axial length to objective focal length ratio of 0.2571.

Figure 4:
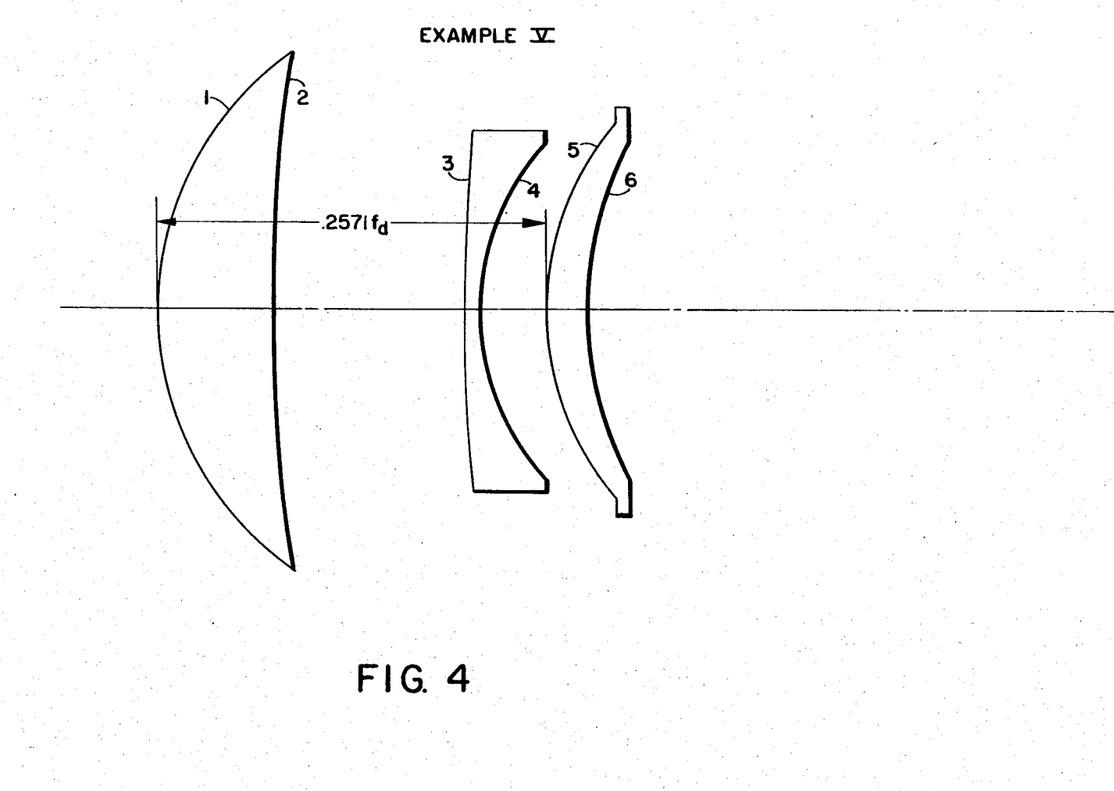
FIG. 4 is an enlarged elevational view of another alternative embodiment of the invention.

TABLE V
(Refer to FIG. 4)

| Surface | Radius | Separation Medium | Air | $N_d$ | $V_d$ |
|---|---|---|---|---|---|
| 1 | 0.2196 | 0.0850 | | 1.4917 | 57.2 |
| 2 | 1.6069* | | 0.1221** | | |
| 3 | 1.3324* | 0.0100 | | 1.592 | 30.8 |
| 4 | 0.1668 | | 0.0400 | | |
| 5 | 0.1824 | 0.0306 | | 1.4917 | 57.2 |
| 6 | 0.2739* | | | | |

*aspheric surfaces
**This air space can be varied for focusing. For this example, the object distance is 17.21 unit lengths where $f_d = 1.0000$ for the singlet of Example I.

Figure 5:
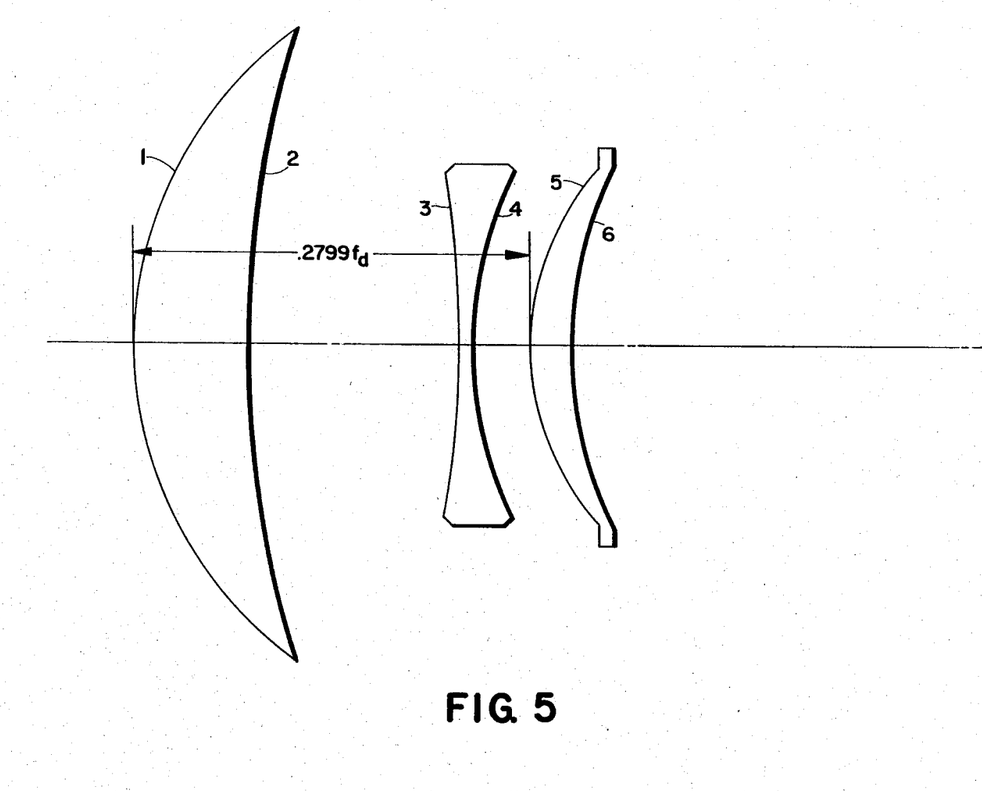
FIG. 5 is an enlarged elevational view of yet another alternative embodiment of the invention.

Surface 2:
 beta = $0.452 \times 10^1$
 gamma = $-0.507 \times 10^2$
 delta = $0.964 \times 10^0$
 epsilon = $0.658 \times 10^{-2}$
 zeta = $0.000 \times 10^0$ Surface 3:
 beta = $-0.865 \times 10^1$
 gamma = $-0.591 \times 10^2$
 delta = $-0.137 \times 10^2$
 epsilon = $-0.116 \times 10^0$
 zeta = $0.000 \times 10^0$ Surface 6:
 beta = $0.517 \times 10^1$
 gamma = $0.151 \times 10^3$
 delta = $-0.900 \times 10^5$
 epsilon = $0.838 \times 10^7$
 zeta = $-0.296 \times 10^9$ A fourth example of the invention, a glass/plastic front component combination with no aspherics, with a magnification of 1.4571 at f/12 and a field angle of 57.38 degrees is represented by the constructional data of Table VI where the surface 6 is aspheric as in the previous examples. The data has been normalized with respect to the focal length of the objective 40, and the axial length to objective focal length ratio for this example is 0.2799.

TABLE VI
(Refer to FIG. 5)

| Surface | Radius | Separation Medium | Air | $N_d$ | $V_d$ |
|---|---|---|---|---|---|
| 1 | 0.2750 | 0.0850 | | 1.652 | 58.5 |
| 2 | 0.8383 | | 0.1449** | | |
| 3 | −1.19999 | 0.0100 | | 1.592 | 30.8 |
| 4 | 0.2816 | | 0.0400 | | |
| 5 | 0.1824 | 0.0306 | | 1.4917 | 57.2 |
| 6 | 0.2739* | | | | |

*aspheric surfaces
**This air space can be varied for focusing. For this example, the object distance is 17.23 unit lengths where $f_d = 1.0000$ for element 40.

Figure 6:
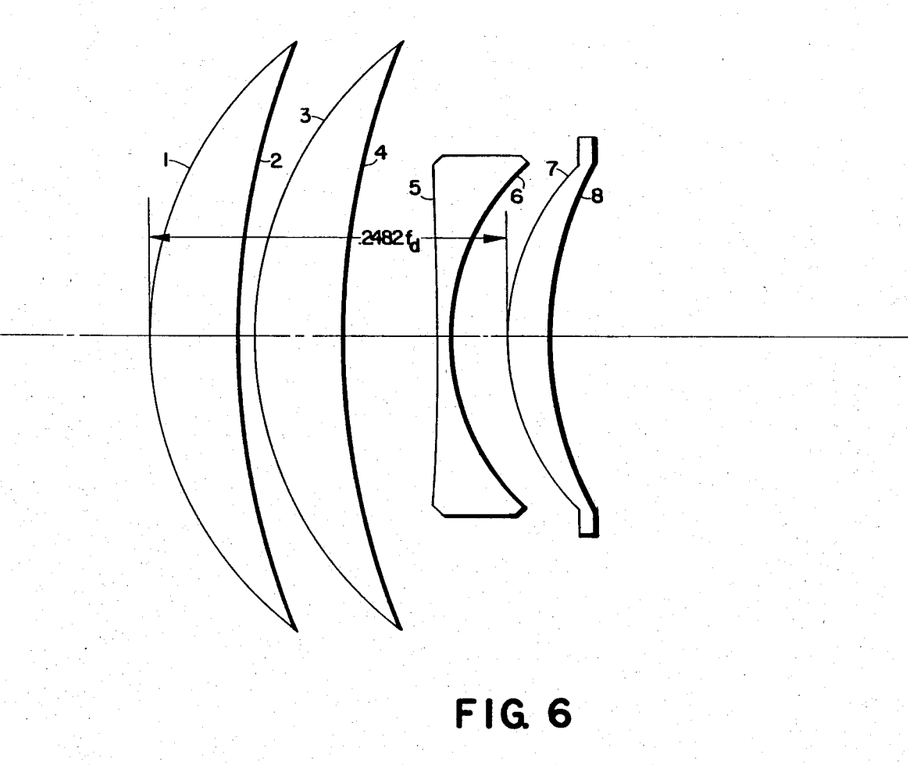
FIG. 6 is an enlarged elevational view of still another alternative embodiment of the invention.

A fifth example of the invention utilizing three elements for the front component, the first two of which are spherical in glass (BK-7 for example) and the third of which is an aspheric plastic (polycarbonate) element, is represented by the constructional data given in Table VII below and the aspheric coefficient data following Table VII. The magnification for this example is 1.4382 at relative aperture of f/12 and a field angle of 57.38 degrees. The overall axial length to objective focal length ratio is 0.2482 and the data has been normalized with respect to the focal length of the element 40 as in previous examples.

TABLE VII
(Refer to FIG. 6)

| Surface | Radius | Separation Medium | Air | $N_d$ | $V_d$ |
|---|---|---|---|---|---|
| 1 | 0.2628 | 0.0650 | | 1.517 | 64.2 |
| 2 | 0.6309 | | 0.0100 | | |
| 3 | 0.2628 | 0.0650 | | 1.517 | 64.2 |
| 4 | 0.6309 | | 0.0582** | | |
| 5 | −3.681* | 0.0100 | | 1.585 | 30.3 |
| 6 | 0.1675 | | 0.0400 | | |
| 7 | 0.1824 | 0.0306 | | 1.4917 | 57.2 |
| 8 | 0.2739* | | | | |

*aspheric surfaces
**This air space can be varied for focusing. For this example, the object distance is 17.21 unit lengths where $f_d = 1.0000$ for element 40.

| | Surface | |
|---|---|---|
| | 5 | 8 |
| beta | $0.512 \times 10^1$ | $0.517 \times 10^1$ |
| gamma | $-0.580 \times 10^2$ | $0.151 \times 10^3$ |
| delta | $-0.137 \times 10^2$ | $-0.900 \times 10^5$ |
| epsilon | $-0.116 \times 10^0$ | $0.838 \times 10^7$ |
| zeta | $0.000 \times 10^0$ | $-0.296 \times 10^9$ |

It is not to be supposed that the angular magnification contributed by the front component of the invention is without limit or that the equivalent focal length of the combination can be increased beyond reasonable measure. In the examples, a conservative approach has been used to balance the increase in equivalent focal length against the steepness of curvatures, sensitivity to misalignments, and increase in distortion residuals, in addition to the need to keep lateral achromatism within reasonable limits. Accordingly, the equivalent focal length of the first example in yellow light was assigned to be 137.3 mm as compared to the focal length of 103.1 mm for the second component used alone.

If the equivalent focal length is further increased, one must note that the lower rim rays to the edge of the useful field are very strongly refracted and cannot easily be controlled without adding an additional element and using one or more aspherics, or else limiting the maximum equivalent focal length to be attained. For present purposes this limit can be set at a gain in equivalent focal length of the combination over the second component used alone as a factor of 1.50 provided the relative aperture is no faster than f/10 and keeping the overall axial length within reasonable bounds, say not in excess of 0.5 times the objective focal length.

If this factor of 1.50 is applied to the focal length of 103.1 mm of the first example, one obtains a projected maximum focal length of 154.58 mm as compared to the 137.3 mm of the first example. Combinations having gains in equivalent focal length greater than the factor of 1.50 are likely to be poor in performance with respect to lateral color or distortion, or in any case if these two aberrations are controlled by the use of more elements or by use of exotic materials as well, the system becomes too costly and too large for applications in instant photography.

By the same token, there will be a lower magnification limit based primarily on considerations of utility versus cost and convenience. If too low a magnification ratio were to be adopted, say, 1.15, the advantages gained would be inappreciable in comparison to the costs incurred. Clearly, so low a factor as 1.15 places little burden on the performance of the add-on first component and hence there is no restriction of note having to do with performance per se. It is a question of where one must draw a line between the extra complexity of having an interchangeable add-on first component and an increase in equivalent focal length that might be considered significant and worthwhile.

Within the bounds of a ratio between 1.15 and 1.50, one can design a variety of add-on front components. If optical glasses are used, one has a very wide selection of indices and dispersions which can be used to reduce or to eliminate the need for one or more aspheric surfaces. However, one pays a penalty in cost and weight if optical glasses are used. If plastic elements are to be used, the small number of types of optical plastics available restricts the design of the first component to fairly strong meniscus elements as indicated in the examples. It will be sufficient to specify a first element of the first component, made of a material preferably plastic in nature, having a reciprocal dispersion or V-value in the range from 50 to 65, and an index of refraction in the range from 1.43 to 1.65.

The first element, whether aspheric or not, will always be of meniscus nature if a wide field is to be covered and if the effective stop of the combination lies well within the lens barrel, that is, in the back portion of the lens system. The net dioptric power will also always be positive, inasmuch as to obtain angular magnification, the cross-section of the entering bundles of rays must be reduced after refraction and on emergence from the meniscus element or elements. The function of the rear portion of the front component is then to render these converging bundles to near parallelism prior to their entering the second fixed component of the system.

In practice the first air space can be varied for focusing for the purpose of holding to a constant back focal distance. For each such air space there would then be some value of $f_d$ which might readily be calculated, but this is of no great importance, since the variation is to preserve the rear conjugate, not any one focal length. The fixed back focal distance and the fixed iris and shutter in this same back focal space preserve the illumination and the aperture-ratio, irrespective of object distance or variation of the first air space.

Convertibility as shown consists of a single mechanical motion, whether of sliding nature or of a rotation, without further need for changing the positioning of the prior positioned parts. In this way also, the exposure controls need not be changed, whether the front component is in its working position or not. That is to say, as far as the sensitive photographic emulsion is concerned, if the assigned iris opening is filled with light, the image brightness is essentially the same on the photographically sensitive surface at the image plane, whether the front component is positioned coaxially or not. While the equivalent focal length of the combination with the front component in place is greater, say, of 150 mm value, the entrance pupil in object space is also greater, in such a way that the speed or 'f-number' remains the same as for the rear component used alone. One says that the assigned iris opening is 'filled' with light, even though the EFL may be different. The only other requirement is that the add-on front component must have clear aperture of its own large enough to accommodate the light that otherwise must be used to fill the iris at all positions over the field of view. Otherwise, vignetting will result. There remains some slight loss of light efficiency when the front component is in place in that there are several more optical surfaces and some minor further absorption of light energy that must be considered. For relatively simple systems, these light losses are of minor nature.

Certain changes may be made in the above-described embodiments without departing from the scope of the invention and those skilled in the optical arts may make still other changes according to the teachings of the disclosure. For example, the size of the optical system described may be scaled up or down in a well-known manner so long as the changes in optical performance which attend such scale changes do not exceed the allowable limits for the particular photographic application. Therefore, it is intended that all matter contained in the above description or shown in the accompanying drawings shall be interpreted as illustrative and not in a limiting sense.

I claim:

1. A substantially afocal lens of Galilean form for use with a following objective lens to increase its focal length, said afocal lens consisting of no more than three lens elements the first of which is a positive meniscus element and the last of which is a negative plastic element spaced behind said positive meniscus element, the ratio of the radius of the front surface of said first positive meniscus element to the axial separation between the first surface of said first meniscus element and the last surface of said negative plastic element being no greater than 1.3 and the angular magnification of said afocal lens being no greater than 1.5.

2. The magnifying lens of claim 1 wherein the index of refraction of said positive meniscus is in the range from 1.43 to 1.652 and has an Abbe V-value in the range from 50 to 65.

3. A substantially afocal lens of Galilean form for use with a following objective lens to increase its focal length, said afocal lens consisting essentially of only two elements one of which is a positive meniscus element and the other of which is a negative plastic element air spaced behind said positive meniscus element, the ratio of the radius of the first surface of said positive meniscus element to the axial separation between the first surface of said positive meniscus element and the last surface of said negative plastic element being no more than 1.2 and the angular magnification of said afocal lens being no more than 1.5.

4. The afocal lens of claim 3 wherein the overall axial length from the first to the last surface of said lens elements is no more than 37 mm.

5. The afocal lens of claim 3 wherein the index of refraction of said meniscus lens element is in the range from 1.43 to 1.65 and has an Abbe V-value in the range from 50 to 65.

6. The afocal lens of claim 3 wherein said optical plastic is selected from the group comprising plexiglass, polycarbonate, and polystyrene.

7. A two element substantially afocal lens for use with an objective of focal length, $f_o$, said afocal lens having constructional data substantially in accordance with the following table:

| Surface | Radius | Separation Medium | Air | $N_d$ | $V_d$ |
|---|---|---|---|---|---|
| 1 | .1901 | .0850 | | 1.4917 | 57.2 |
| 2 | .8579 | | .0652 | | |
| 3 | .5958 | .0100 | | 1.592 | 30.8 |
| 4 | .1499 | | | | | in which said surfaces are the surfaces of said elements in numerical order from object space to image space, said radii and separations are normalized to $f_o$, $N_d$ is the index of refraction, $V_d$ is the Abbe dispersion number, and wherein surfaces 2 and 3 are aspheric in shape and have the general formula:

$$Z = \frac{CS^2}{1 + \sqrt{1 - C^2S^2}} + \beta S^4 + \gamma S^6 + \delta S^8 + \epsilon S^{10} + \zeta S^{12}$$

where C is the reciprocal of the surface apex radius, Z represents the distance of a point on the aspheric surface measured from the surface vertex and parallel to the Z-axis, and S is the radial distance of the point measured perpendicular to the Z-axis and wherein the coefficients, $\beta$ through $\zeta$, normalized to $f_o$, are given by the following table:

| | Surface | |
|---|---|---|
| | 2 | 3 |
| beta | $0.787 \times 10^1$ | $-0.388 \times 10^1$ |
| gamma | $-0.707 \times 10^2$ | $-0.588 \times 10^2$ |
| delta | $0.964 \times 10^0$ | $-0.137 \times 10^2$ |
| epsilon | $0.658 \times 10^{-2}$ | $-0.116 \times 10^0$ |
| zeta | $0.000 \times 10^0$ | $0.000 \times 10^0$ |

8. A convertible objective lens comprising a front substantially afocal component consisting of two air spaced elements and a rear component consisting of a single meniscus lens element of unit focal length, $f_o$, said front component being mounted for movement into and out of coaxial alignment with said rear component to in combination therewith provide a system having a focal length greater than that of said rear component used above, said objective lens having the following constitutional data:

| | Surface | Radius | Separation Medium | Air | $N_d$ | $V_d$ |
|---|---|---|---|---|---|---|
| FRONT | 1 | .1901 | .0850 | | 1.4917 | 57.2 |
| | 2 | .8579 | | .0652 | | |
| | 3 | .5958 | .0100 | | 1.592 | 30.8 |
| | 4 | .1499 | | .0400 | | |
| REAR | 5 | .1824 | .0306 | | 1.4917 | 57.2 |
| | 6 | .2739 | | | | | in which said surfaces are the surfaces of said elements in numerical order from object space to image space, said radii and separations are normalized to $f_o$, $N_d$ is the index of refraction, $V_d$ is the Abbe dispersion number and wherein surfaces 2, 3 and 6 are aspheric in shape and have the general formula:

$$Z = \frac{CS^2}{1 + \sqrt{1 - C^2S^2}} + \beta S^4 + \gamma S^6 + \delta S^8 + \epsilon S^{10} + \zeta S^{12}$$

where C is the reciprocal of the surface apex radius, Z represents the distance of a point on the aspheric surface measured from the surface vertex and parallel to the Z-axis, and S is the radial distance of the point measured perpendicular to the Z-axis and wherein the coefficients, $\beta$ through $\zeta$, normalized to $f_o$, are given by the following table:

| | Surface | | |
|---|---|---|---|
| | 2 | 3 | 6 |
| beta | $0.787 \times 10^1$ | $-0.388 \times 10^1$ | $0.517 \times 10^1$ |
| gamma | $-0.707 \times 10^2$ | $-0.588 \times 10^2$ | $0.151 \times 10^3$ |
| delta | $0.964 \times 10^0$ | $-0.137 \times 10^2$ | $-0.900 \times 10^5$ |
| epsilon | $0.658 \times 10^{-2}$ | $-0.116 \times 10^0$ | $0.838 \times 10^7$ |
| zeta | $0.000 \times 10^0$ | $0.000 \times 10^0$ | $-0.296 \times 10^9$ |

9. A two element substantially afocal lens for use with an objective of focal length, $f_o$, said afocal lens having constructional data substantially in accordance with the following table:

| Surface | Radius | Separation Medium | Air | $N_d$ | $V_d$ |
|---|---|---|---|---|---|
| 1 | .2543 | .0850 | | 1.652 | 58.5 |
| 2 | .9005 | | .1221 | | |
| 3 | 1.0230 | .0100 | | 1.592 | 30.8 |
| 4 | .1635 | | | | | in which said surfaces are the surfaces of said elements in numerical order from object space to image space, said radii and separations are normalized to $f_o$, $N_d$ is the index of refraction, $V_d$ is the Abbe dispersion number, and wherein surface 3 is aspheric in shape and has the general formula:

$$Z = \frac{CS^2}{1 + \sqrt{1 - C^2S^2}} + \beta S^4 + \gamma S^6 + \delta S^8 + \epsilon S^{10} + \zeta S^{12}$$

where C is the reciprocal of the surface apex radius, Z represents the distance of a point on the aspheric surface measured from the surface vertex and parallel to the Z-axis, and S is the radial distance of the point measured perpendicular to the Z-axis and wherein the coefficients, $\beta$ through $\zeta$, normalized to $f_o$, are given by the following table:

|  | Surface |
|  | 3 |
| --- | --- |
| beta | $-0.592 \times 10^1$ |
| gamma | $-0.594 \times 10^2$ |
| delta | $-0.137 \times 10^2$ |
| epsilon | $-0.116 \times 10^0$ |
| zeta | $0.000 \times 10^0$ |

10. A convertible objective lens comprising a front substantially afocal component consisting of two air spaced elements and a rear component consisting of a single meniscus lens element of unit focal length, $f_o$, said front component being mounted for movement into and out of coaxial alignment with said rear component to in combination therewith provide a system whose focal length is larger than that of the rear component by itself, said objective lens having the following constitutional data:

|  | Surface | Radius | Separation Medium | Air | $N_d$ | $V_d$ |
| --- | --- | --- | --- | --- | --- | --- |
| FRONT | 1 | .2543 | .0850 |  | 1.652 | 58.5 |
|  | 2 | .9005 |  | .1221 |  |  |
|  | 3 | 1.0230 | .0100 |  | 1.592 | 30.8 |
|  | 4 | .1635 |  | .0400 |  |  |
| REAR | 5 | .1824 | .0306 |  | 1.535 | 41.5 |
|  | 6 | .2739 |  |  | 1.4917 | 57.2 | in which said surfaces are the surfaces of said elements in numerical order from object space to image space, said radii and separations are normalized to $f_o$, $N_d$ is the index of refraction, $V_d$ is the Abbe dispersion number, and wherein surfaces 3 and 6 are aspheric in shape and have the general formula:

$$Z = \frac{CS^2}{1 + \sqrt{1 - C^2S^2}} + \beta S^4 + \gamma S^6 + \delta S^8 + \epsilon S^{10} + \zeta S^{12}$$

where C is the reciprocal of the surface apex radius, Z represents the distance of a point on the aspheric surface measured from the surface vertex and parallel to the Z-axis, and S is the radial distance of the point measured perpendicular to the Z-axis and wherein the coefficients, $\beta$ through $\zeta$, normalized to $f_o$, are given by the following table:

|  | Surface | |
|  | 3 | 6 |
| --- | --- | --- |
| beta | $-0.592 \times 10^1$ | $0.517 \times 10^1$ |
| gamma | $-0.594 \times 10^2$ | $0.151 \times 10^3$ |
| delta | $-0.137 \times 10^2$ | $-0.900 \times 10^5$ |
| epsilon | $-0.116 \times 10^0$ | $0.838 \times 10^7$ |
| zeta | $0.000 \times 10^0$ | $-0.296 \times 10^9$ |

11. A two element substantially afocal lens for use with an objective of focal length, $f_o$, said afocal lens having constructional data substantially in accordance with the following table:

| Surface | Radius | Separation Medium | Air | $N_d$ | $V_d$ |
| --- | --- | --- | --- | --- | --- |
| 1 | .2196 | .0850 |  | 1.4917 | 57.2 |
| 2 | 1.6069 |  | .1221 |  |  |
| 3 | 1.3324 | .0100 |  | 1.592 | 30.8 |

| Surface | Radius | Separation Medium | Air | $N_d$ | $V_d$ |
| --- | --- | --- | --- | --- | --- |
| 4 | .1668 |  |  |  |  | in which said surfaces are the surfaces of said elements in numerical order from object space to image space, said radii and separations are normalized to $f_o$, $N_d$ is the index of refraction, $V_d$ is the Abbe dispersion number, and wherein surfaces 2 and 3 are aspheric in shape and have the general formula:

$$Z = \frac{CS^2}{1 + \sqrt{1 - C^2S^2}} + \beta S^4 + \gamma S^6 + \delta S^8 + \epsilon S^{10} + \zeta S^{12}$$

where C is the reciprocal of the surface apex radius, Z represents the distance of a point on the aspheric surface measured from the surface vertex and parallel to the Z-axis, and S is the radial distance of the point measured perpendicular to the Z-axis and wherein the coefficients, $\beta$ through $\zeta$, normalized to $f_o$, are given by the following table:

|  | Surface | |
|  | 2 | 3 |
| --- | --- | --- |
| beta | $0.452 \times 10^1$ | $-0.865 \times 10^1$ |
| gamma | $-0.507 \times 10^2$ | $-0.591 \times 10^2$ |
| delta | $0.964 \times 10^0$ | $-0.137 \times 10^2$ |
| epsilon | $0.658 \times 10^{-2}$ | $-0.116 \times 10^0$ |
| zeta | $0.000 \times 10^0$ | $0.000 \times 10^0$ |

12. A convertible objective lens comprising a front substantially afocal component consisting of two air spaced elements and a rear component consisting of a single meniscus lens element of unit focal length, $f_o$, said front component being mounted for movement into and out of coaxial alignment with said rear component to in combination therewith provide a system whose focal length is longer than that of said rear component by itself when in coaxial alignment therewith, said objective lens having the following constitutional data:

|  | Surface | Radius | Separation Medium | Air | $N_d$ | $V_d$ |
| --- | --- | --- | --- | --- | --- | --- |
| FRONT | 1 | .2196 | .0850 |  | 1.4917 | 57.2 |
|  | 2 | 1.6069 |  | .1221 |  |  |
|  | 3 | 1.3324 | .0100 |  | 1.592 | 30.8 |
|  | 4 | .1668 |  | .0400 |  |  |
| REAR | 5 | .1824 | .0306 |  | 1.4917 | 57.2 |
|  | 6 | .2739 |  |  |  |  | in which said surfaces are the surfaces of said elements in numerical order from object space to image space, said radii and separations are normalized to $f_o$, $N_d$ is the index of refraction, $V_d$ is the Abbe dispersion number and wherein surfaces 2, 3 and 6 are aspheric in shape and have the general formula:

$$Z = \frac{CS^2}{1 + \sqrt{1 - C^2S^2}} + \beta S^4 + \gamma S^6 + \delta S^8 + \epsilon S^{10} + \zeta S^{12}$$

where C is the reciprocal of the surface apex radius, Z represents the distance of a point on the aspheric surface measured from the surface vertex and parallel to the Z-axis, and S is the radial distance of the point measured perpendicular to the Z-axis and wherein the coefficients, $\beta$ through $\zeta$, normalized to $f_o$, are given by the following table:

|  | Surface | | |
|---|---|---|---|
|  | 2 | 3 | 6 |
| beta | $0.452 \times 10^1$ | $-0.865 \times 10^1$ | $0.517 \times 10^1$ |
| gamma | $-0.507 \times 10^2$ | $-0.591 \times 10^2$ | $0.151 \times 10^3$ |
| delta | $0.964 \times 10^0$ | $-0.137 \times 10^2$ | $-0.900 \times 10^5$ |
| epsilon | $0.658 \times 10^{-2}$ | $-0.116 \times 10^0$ | $0.838 \times 10^7$ |
| zeta | $0.000 \times 10^0$ | $0.000 \times 10^0$ | $-0.296 \times 10^9$ |

13. A two element substantially afocal lens for use with an objective of focal length, $f_o$, said afocal lens having constructional data substantially in accordance with the following table:

| Surface | Radius | Separation | | $N_d$ | $V_d$ |
|---|---|---|---|---|---|
|  |  | Medium | Air |  |  |
| 1 | .2750 | .0850 |  | 1.652 | 58.5 |
| 2 | .8383 |  | .1449 |  |  |
| 3 | −1.199 | .0100 |  | 1.592 | 30.8 |
| 4 | .2816 |  |  |  |  | in which said surfaces are the surfaces of said elements in numerical order from object space to image space, said radii and separations are normalized to $f_o$, $N_d$ is the index of refraction and $V_d$ is the Abbe dispersion number.

14. A convertible objective lens comprising a front substantially afocal component consisting of two air spaced elements and a rear component consisting of a single meniscus lens element of unit focal length, $f_o$, said front component being mounted for movement into and out of coaxial alignment with said rear component to in combination therewith provide a system whose focal length is longer than that of said rear component by itself when in coaxial alignment therewith, said objective lens having the following constitutional data:

|  | Surface | Radius | Separation | | $N_d$ | $V_d$ |
|---|---|---|---|---|---|---|
|  |  |  | Medium | Air |  |  |
| FRONT | 1 | .2750 | .0850 |  | 1.652 | 58.5 |
|  | 2 | .8383 |  | .1449 |  |  |
|  | 3 | −1.199 | .0100 |  | 1.592 | 30.8 |
|  | 4 | .2816 |  | .0400 |  |  |
| REAR | 5 | .1824 | .0306 |  | 1.4917 | 57.2 |
|  | 6 | .2739 |  |  |  |  | in which said surfaces are the surfaces of said elements in numerical order from object space to image space, said radii and separations are normalized to $f_o$, $N_d$ is the index of refraction, $V_d$ is the Abbe dispersion number and wherein surface 6 is aspheric in shape and has the general formula:

$$Z = \frac{CS^2}{1 + \sqrt{1 - C^2S^2}} + \beta S^4 + \gamma S^6 + \delta S^8 + \epsilon S^{10} + \zeta S^{12}$$

where C is the reciprocal of the surface apex radius, Z represents the distance of a point on the aspheric surface measured from the surface vertex and parallel to the Z-axis, and S is the radial distance of the point measured perpendicular to the Z-axis and wherein the coefficients, $\beta$ through $\zeta$, normalized to $f_o$, are given by the following table:

|  | Surface 6 |
|---|---|
| beta | $0.517 \times 10^1$ |
| gamma | $0.151 \times 10^3$ |
| delta | $-0.900 \times 10^5$ |
| epsilon | $0.838 \times 10^7$ |
| zeta | $-0.296 \times 10^9$ |

15. A three element substantially afocal lens for use with an objective of focal length, $f_o$, said afocal lens having constructional data substantially in accordance with the following table:

| Surface | Radius | Separation | | $N_d$ | $V_d$ |
|---|---|---|---|---|---|
|  |  | Medium | Air |  |  |
| 1 | .2628 | .0650 |  | 1.517 | 64.2 |
| 2 | .6309 |  | .0100 |  |  |
| 3 | .2628 | .0650 |  | 1.517 | 64.2 |
| 4 | .6309 |  | .0582 |  |  |
| 5 | −3.681 | .0100 |  | 1.585 | 30.3 |
| 6 | .1675 |  |  |  |  | in which said surfaces are the surfaces of said elements in numerical order from object space to image space, said radii and separations are normalized to $f_o$, $N_d$ is the index of refraction, $V_d$ is the Abbe dispersion number and wherein surface 5 is aspheric in shape and has the general formula:

$$Z = \frac{CS^2}{1 + \sqrt{1 - C^2S^2}} + \beta S^4 + \gamma S^6 + \delta S^8 + \epsilon S^{10} + \zeta S^{12}$$

where C is the reciprocal of the surface apex radius, Z represents the distance of a point on the aspheric surface measured from the surface vertex and parallel to the Z-axis, and S is the radial distance of the point measured perpendicular to the Z-axis and wherein the coefficients, $\beta$ through $\zeta$, normalized to $f_o$, are given by the following table:

|  | Surface 5 |
|---|---|
| beta | $0.512 \times 10^1$ |
| gamma | $-0.580 \times 10^2$ |
| delta | $-0.137 \times 10^2$ |
| epsilon | $-0.116 \times 10^0$ |
| zeta | $0.000 \times 10^0$ |

16. A convertible objective lens comprising a front substantially afocal component consisting of two air spaced elements and a rear component consisting of a single meniscus lens element of unit focal length, $f_o$, said front component being mounted for movement into and out of coaxial alignment with said rear component to in combination therewith provide a system whose focal length is longer than that of said rear component by itself when in coaxial alignment therewith, said objective lens having the following constitutional data:

|  | Surface | Radius | Separation | | $N_d$ | $V_d$ |
|---|---|---|---|---|---|---|
|  |  |  | Medium | Air |  |  |
| FRONT | 1 | .2628 | .0650 |  | 1.517 | 64.2 |
|  | 2 | .6309 |  | .0100 |  |  |

-continued

| | Surface | Radius | Separation Medium | Air | $N_d$ | $V_d$ |
|---|---|---|---|---|---|---|
| | 3 | .2628 | .0650 | | 1.517 | 64.2 |
| | 4 | .6309 | | .0582 | | |
| | 5 | −3.681 | .0100 | | 1.585 | 30.3 |
| | 6 | .1675 | | .0400 | | |
| REAR | 7 | .1824 | .0306 | | 1.4917 | 57.2 |
| | 8 | .2739 | | | | | in which said surfaces are the surfaces of said elements in numerical order from object space to image space, said radii and separations are normalized to $f_o$, $N_d$ is the index of refraction, $V_d$ is the Abbe dispersion number and wherein surfaces 5 and 8 are aspheric in shape and have the general formula:

$$Z = \frac{CS^2}{1 + \sqrt{1 - C^2S^2}} + \beta S^4 + \gamma S^6 + \delta S^8 + \epsilon S^{10} + \zeta S^{12}$$

where C is the reciprocal of the surface apex radius, Z represents the distance of a point on the aspheric surface measured from the surface vertex and parallel to the Z-axis, and S is the radial distance of the point measured perpendicular to the Z-axis and wherein the coefficients, $\beta$ through $\zeta$, normalized to $f_o$, are given by the following table:

| | Surface | |
|---|---|---|
| | 5 | 8 |
| beta | $0.512 \times 10^1$ | $0.517 \times 10^1$ |
| gamma | $-0.580 \times 10^2$ | $0.151 \times 10^3$ |
| delta | $-0.137 \times 10^2$ | $-0.900 \times 10^5$ |
| epsilon | $-0.116 \times 10^0$ | $0.838 \times 10^7$ |
| zeta | $0.000 \times 10^0$ | $-0.296 \times 10^9$ |

\* \* \* \* \*